United States Patent
Beenen

(10) Patent No.: US 11,400,854 B2
(45) Date of Patent: Aug. 2, 2022

(54) ACCESSIBLE REAR SEAT LATCH RELEASE

(71) Applicant: BuiltRight Industries LLC, Minneapolis, MN (US)

(72) Inventor: Matt Beenen, Minneapolis, MN (US)

(73) Assignee: BuiltRight Industries LLC, Minneapolis, MN (US)

( * ) Notice: Subject to any disclaimer, the term of this patent is extended or adjusted under 35 U.S.C. 154(b) by 941 days.

(21) Appl. No.: 16/137,747

(22) Filed: Sep. 21, 2018

(65) Prior Publication Data

US 2019/0092192 A1   Mar. 28, 2019

Related U.S. Application Data

(60) Provisional application No. 62/561,774, filed on Sep. 22, 2017.

(51) Int. Cl.
*B60R 5/00* (2006.01)
*B60P 7/08* (2006.01)
*B62D 33/023* (2006.01)
*B60R 9/02* (2006.01)
*B60R 9/06* (2006.01)
(Continued)

(52) U.S. Cl.
CPC ......... *B60P 7/0807* (2013.01); *B60N 2/2245* (2013.01); *B60P 3/007* (2013.01); *B60R 5/00* (2013.01); *B60R 5/04* (2013.01); *B60R 7/00* (2013.01); *B60R 7/02* (2013.01); *B60R 9/00* (2013.01); *B60R 9/02* (2013.01); *B60R 9/06* (2013.01); *B60R 9/065* (2013.01); *B62D 33/023* (2013.01); *B62D 33/0207* (2013.01); *B65D 90/0053* (2013.01)

(58) Field of Classification Search
CPC ............ B60N 2/2245; B60N 2/3009; B60N 2205/40; B60R 5/04; B60R 7/00
USPC ........... 296/37.16, 65.09, 65.16; 297/378.12, 297/378.13, 463.1
See application file for complete search history.

(56) References Cited

U.S. PATENT DOCUMENTS 3,121,585 A * 2/1964 Krueger ................... B60N 2/36
296/37.16
8,047,614 B2 † 11/2011 Goshima
(Continued)

FOREIGN PATENT DOCUMENTS

JP   H11278117 A † 10/1999
WO  WO2012123955 A2 † 9/2012

OTHER PUBLICATIONS

Author: Meeker ExtremeTtitle: 2016 Ford F150 XL—Folding Backseat down Issues!!!!pp. Youtube videoPublicaiton Date: uploaded on Mar. 12, 2017.†

*Primary Examiner* — Stephen T Gordon
(74) *Attorney, Agent, or Firm* — Edwin A. Sisson, Attorney at Law, LLC; Jeffrey J. Banyas

(57) ABSTRACT

A rear seat latch release device is easily installed to a portion of a rear seat holding mechanism so the rear seat can be released and more effectively folded down. The rear seat latch release device is specifically designed to surround the factory latch, and allow a pull strap to be added, which can more easily and effectively operate the rear seat latch. Components of the rear seat latch release device are designed to easily cooperate with several variations in the factory latch, thereby allowing installation in many different situations.

3 Claims, 9 Drawing Sheets

(51) Int. Cl.
*B62D 33/02* (2006.01)
*B60R 7/00* (2006.01)
*B60R 5/04* (2006.01)
*B60P 3/00* (2006.01)
*B60R 7/02* (2006.01)
*B60R 9/00* (2006.01)
*B65D 90/00* (2006.01)
*B60N 2/22* (2006.01)

(56) References Cited

U.S. PATENT DOCUMENTS

| | | | |
|---|---|---|---|
| 8,235,446 B2 * | 8/2012 | Aoki | B60N 2/3079 296/65.09 |
| 2009/0039687 A1 * | 2/2009 | Hinata | B60N 2/2245 297/216.14 |
| 2011/0115274 A1 * | 5/2011 | Hazlewood | B60N 2/12 297/378.12 |
| 2015/0028618 A1 * | 1/2015 | Seto | B60N 2/366 296/65.09 |
| 2016/0375818 A1 * | 12/2016 | Murillo | B60P 7/0807 248/503 |

\* cited by examiner
† cited by third party

ACCESSIBLE REAR SEAT LATCH RELEASE

BACKGROUND

The fold down rear seat of a pickup truck is a particularly useful feature as it provides access to additional storage space and the ability to reconfigure the way space is used. This feature is provided in many commercially available pick-up trucks including the Ford® F-Series, the Dodge® Ram, and the Chevy® Silverado lines of vehicles. While many different mechanisms are used, there will typically be some type of locking or latching which will keep the seat back in an upright position until it is necessary to fold it down. That said, the ability to operate existing latching mechanisms is sometimes challenging and cumbersome. As one example, beginning in 2009 Ford trucks were equipped with a small mechanical latch mechanism attached to the rear of the seat back, which cooperates with a portion of the truck body to lock the seat back in an upright position. When it is necessary to fold down the rear seat this latch must be released. Unfortunately, the latch is positioned in an area that is difficult to reach without an extension or tool of some sort.

In many situations, truck owners have drilled a hole in the stock Ford latches and attached a wire or string to use as a pull cord, thus providing some additional convenience when it was necessary to release the latch and fold down the rear seat. An alternative to this method is to tie a cord or 'zip tie' to the Latch Pin. That said, both of these solutions fail to provide a means of quickly easily and reliably releasing the latch from above the seat without modification to any of the factory components. Truck owners are thus left with an inconvenient and cumbersome latch mechanism that is difficult to use.

SUMMARY

The embodiments discussed below provide a device for more easily releasing the seat back latch on the driver and passenger's side in order to fold it down. The device designed to provide an extension strap for use with a stock latch (such as a latch commonly used on a Ford vehicle) without having to drill or otherwise modify the factory components. This also provides a method of more easily accessing the latch and thus folding down the seat or any other area that the latch controls access to. This extension strap can be made visible to a person sitting or standing inside or alongside the vehicle, offering access to users that may be otherwise unfamiliar with the hidden components that make up the rear seat structure.

In addition, the device uses the existing latch to preserve the manufacturers intended structural rigidity, but provides a method of releasing the latch that is both easily accessible to the user without having to squeeze a hand into tight spaces or modify existing components to adapt a solution.

BRIEF DESCRIPTION OF THE DRAWINGS

Various advantages and features of the various embodiments will be apparent from reading the following detailed description, in conjunction with the drawings, in which.

DETAILED DESCRIPTION

The embodiments of present invention illustrate a device to make the latch behind the rear seat of a truck more accessible. In particular, the disclosed embodiments accommodate access to the area behind the rear seat of a pickup truck, without the use of tools or modification of the factory components.

Figure 1:
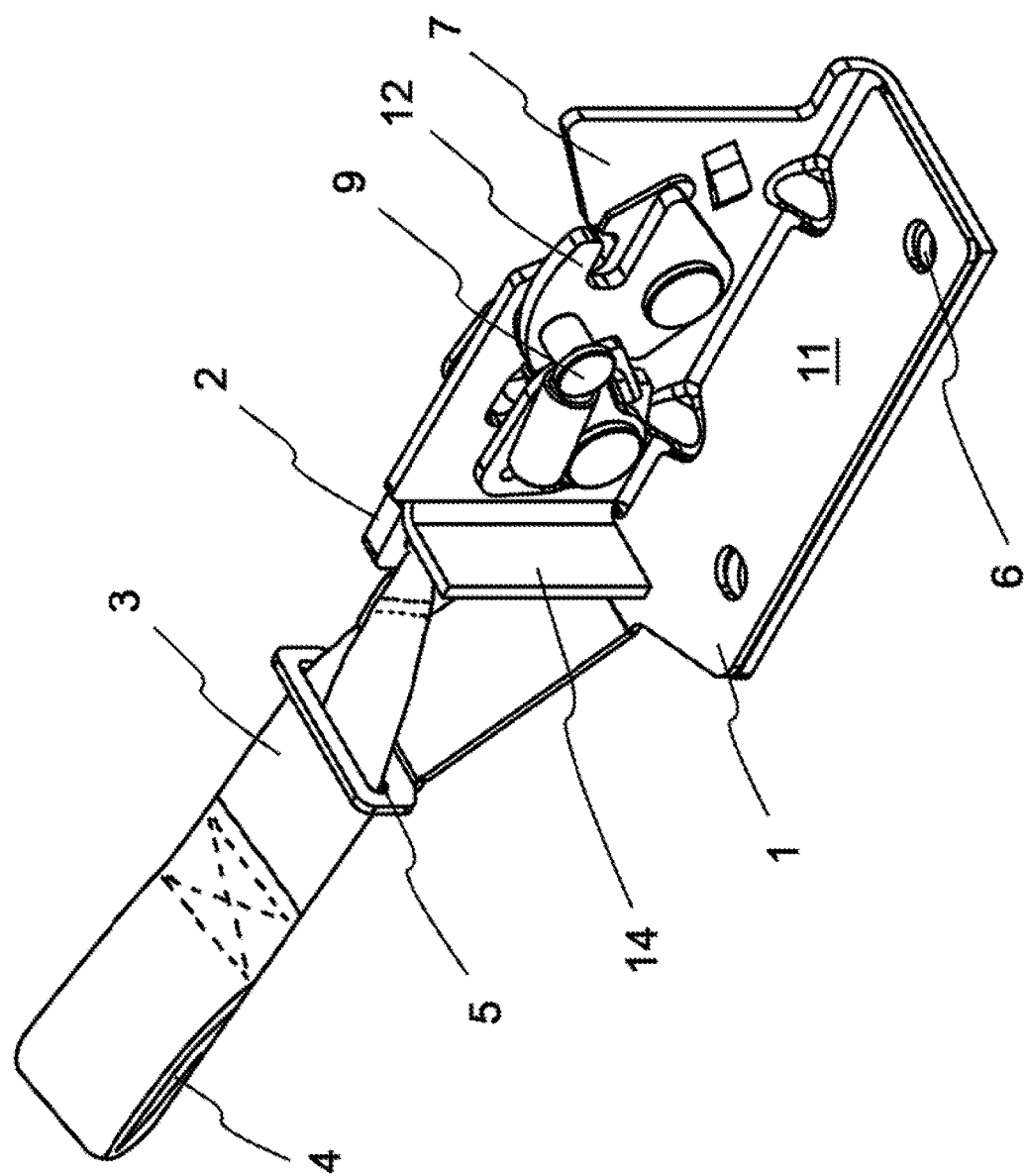
FIG. 1 shows Rear Seat Latch Release Device installed with the factory latch.

Referring now to FIG. 1, a Rear Seat Latch Release Device 10 is illustrated. In this view, the Release device 10 is installed and cooperating with a factory latch 7 that comes standard on many trucks (for example, Ford F-Series pickup trucks). It will be appreciated that factory latch 7 is specifically configured to capture a holding bracket (20) which is typically attached to the framework 22 of the truck (e.g. attached to a rear wall of the truck cab). This holding bracket typically has a bar or loop portion which can be captured by related mechanisms of factory latch 7.

Figure 5:
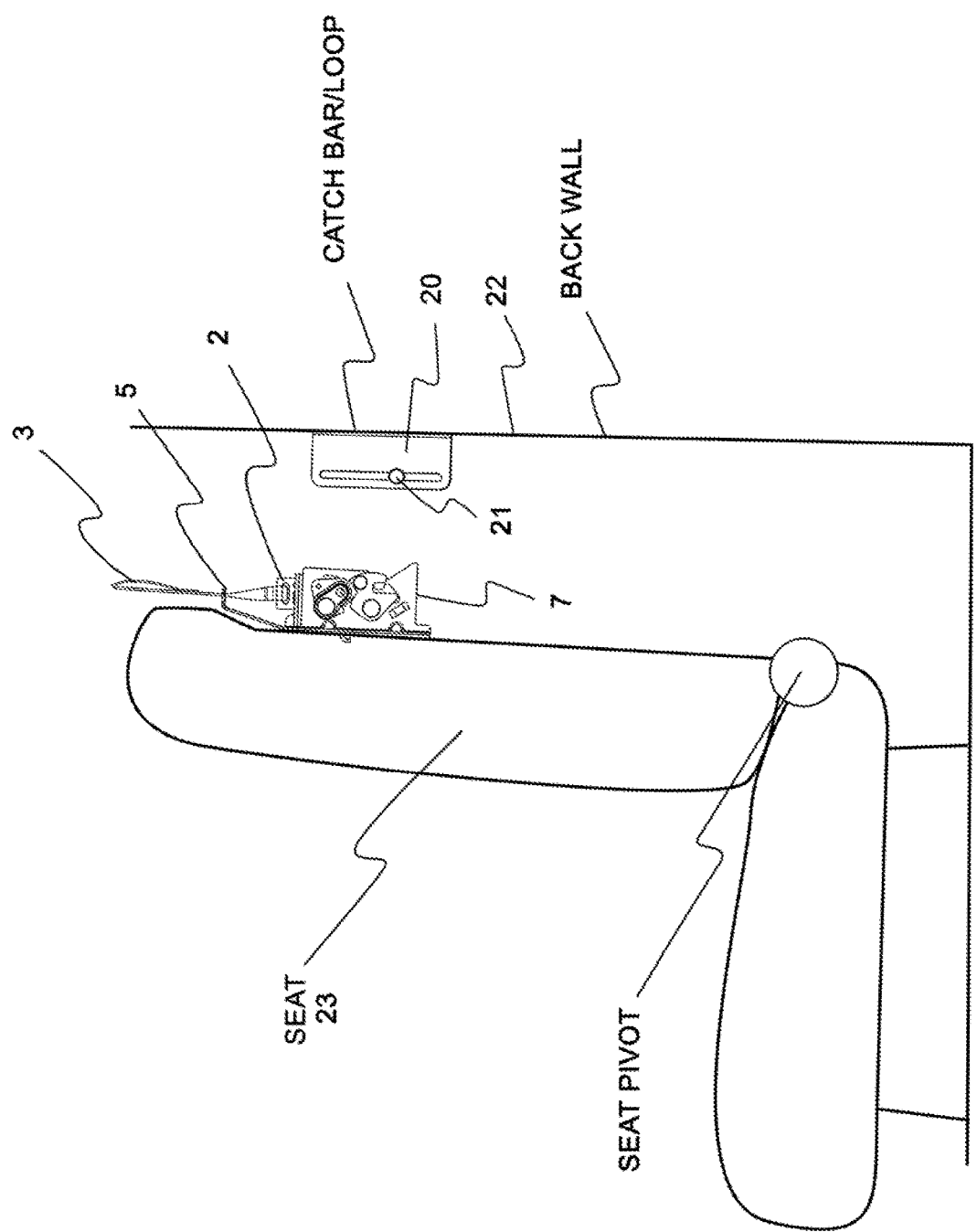
FIG. 5 is a perspective view of an exemplary seat back and truck frame showing the Rear Seat Latch Release Device as installed.

Turning now to FIG. 5 a typical installation of factory latch 7 and rear seat latch release device 10 is better illustrated. As shown, a back wall 22 and rear seat of a pickup is generally illustrated. A holding bracket 20 is generally attached to back wall 22, and specifically includes a holding bar or pin 21 which is specifically sized and designed to interact with factory latch 7. As further shown, factory latch 7 and rear seat latch device 10 are both attached to the back side of a seat 23. Those skilled in the art will recognize that seat upright 23 is designed to pivot and fold down. Clearly, factory latch 7 is designed to hold seat back 23 in its upright position.

Figure 3:
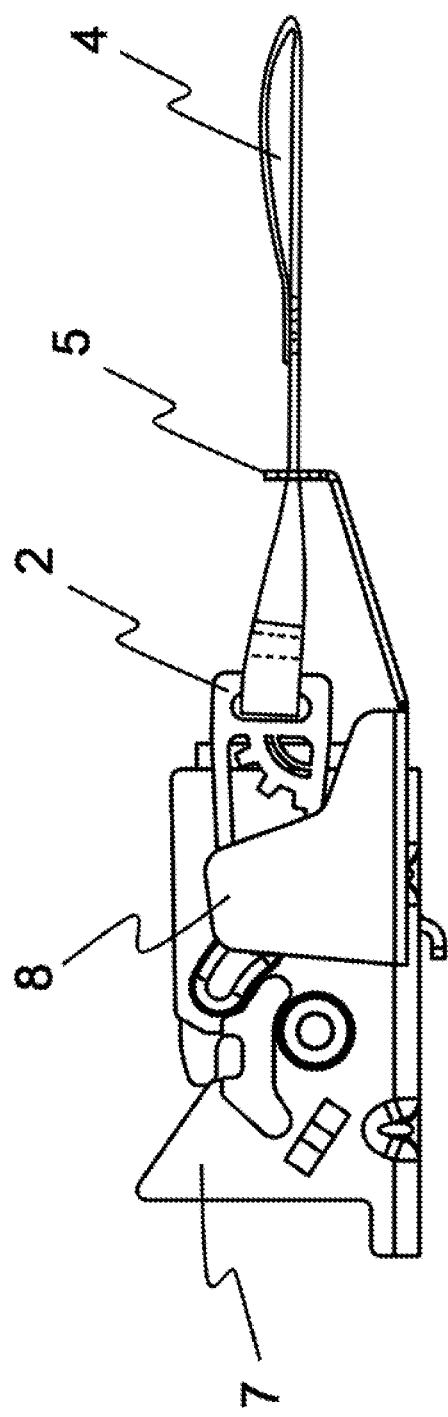
FIG. 3 shows side view Rear Seat Latch Release Device as installed.
Figure 4:
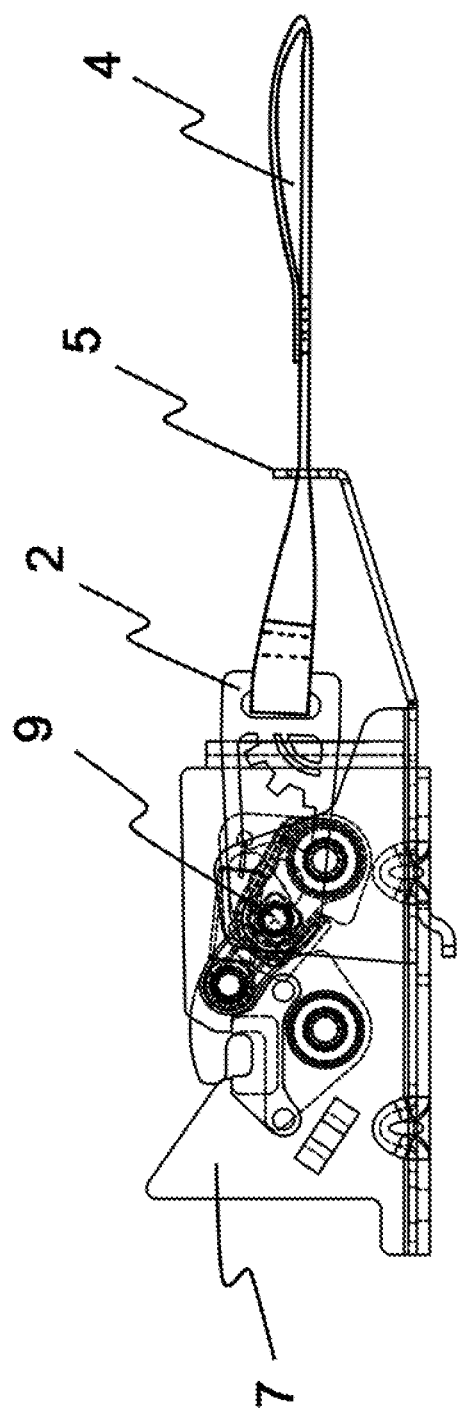
FIG. 4 shows a partial cut-away side view Rear Seat Latch Release Device as installed, illustrating certain components of with the factory latch.

As better illustrated in FIGS. 1, 3 & 4, the holding bracket will be captured within a capture slot 12. Factory latch 7 is then released by causing a holding structure to move, thereby allowing the holding bracket to be released or no longer engaged/captured within capture slot 12 of factory latch 7. This disengaging action is achieved by pulling on release tab 14, which is part of factory latch 7. That said, release tab 14 is often difficult to access and not easy to operated. Thus, improved operation is clearly beneficial.

Again, as shown in FIG. 1, release device 10 includes a latch base bracket 1 which can be installed using the two bolts (not shown) that secure the factory latch 7 to the seat frame. As more fully described below, a latch pull bracket 2 and a webbing strap 3 are installed through a strap support 5, which helps to accommodate operation. As also shown, latch pull bracket 2 is installed onto or intermingled with factory latch 7.

Throughout the drawings, and in the following description, reference numbers are used to identify the following elements:

1 LATCH BASE BRACKET
2 LATCH PULL BRACKET
3 WEBBING STRAP
4 LOOP
5 STRAP SUPPORT
6 MOUNTING HOLE
7 FACTORY LATCH
8 RETAINING TAB
9 LATCH PIN
10 REAR SEAT LATCH RELEASE DEVICE
11 BASE PLATE PORTION
12 CAPTURE SLOT
14 RELEASE TAB
16 KEYHOLE FEATURE
17 BRACKET OPENING
18 BRACKET SLOT
20 HOLDING BRACKET
21 HOLDING BAR OR PIN
22 TRUCK FRAME
23 SEAT BACK

Figure 2:
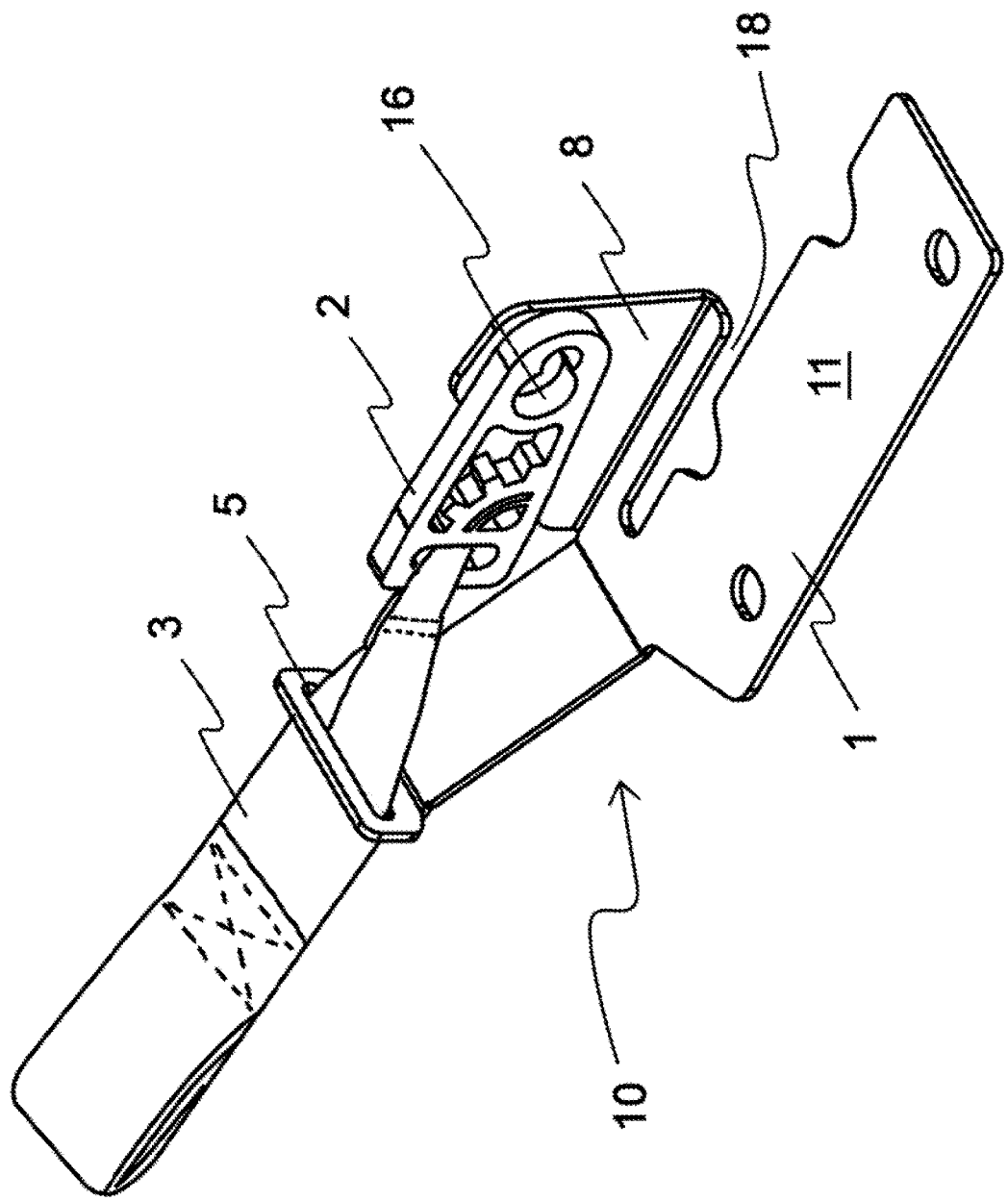
FIG. 2 shows Rear Seat Latch Release Device components as assembled.

As shown in FIG. 2 rear seat latch release device 10 is made up of latch base bracket 1, latch pull bracket 2, and webbing strap 3. More specifically illustrated in this FIG. 2 are certain details of latch pull bracket 2, including a 'keyhole' feature 16 that is uniquely designed to surround the latch pin 9. This feature is designed to easily cooperate with several revisions of the OEM latch 7 and latch pin 9. One revision includes a latch pin with a square feature at the end. This 'keyhole' feature is made using two overlapping holes and allows the use of the same latch pull bracket regardless of which OEM latch it interfaces with.

When a user wishes to fold down a rear seat, they will pull on loop 4 in webbing strap 3 which releases the stock latch 7. This will cause the holding bracket to be released from capture slot 12, thereby allowing these two components to move freely. The user can then fold down the seat back down to access the space behind it. As will be appreciated, stock latch 7 will automatically re-latch the rear seat back when the seat back is lifted back into its upright position.

As best shown in FIG. 2, latch pull bracket 2 is prevented from slipping off of the latch pin 9 by the configuration and features of latch base bracket 1. More specifically, latch base bracket 1 includes strap support feature 5 to hold webbing strap 3 in place. The latch base bracket also includes a retainer tab 8 which is designed to prevent the latch pull bracket 2 from sliding off of the latch pin 9. It is important to note that the stock latch 7 and latch pin 9 can take different forms, but that the latch pull bracket accommodates each pin shape.

Referring now to FIGS. 3 and 4, rear seat latch release device 10 is shown as installed. FIG. 3. As suggested above, latch base bracket 1 is configured to be mounted using the same mounting bolts holding factory latch 7. This will cause a portion of factory latch 7 to be positioned within a bracket slot 18 (see FIG. 2) which is situated between a base plate portion 11 and retaining tab 8. As best shown n FIG. 3, retaining tab 8 is positioned to be on the outside of factory latch 7. In this manner, latch base bracket 1 surrounds factory latch 7 and helps to maintain appropriate positioning. It should be noted that an alternative latch base bracket could be positioned and held below the factory latch without impacting the operation or efficiency of the rear seat latch device.

As mentioned above, latch pull bracket 2 is specifically designed to have a keyhole feature 16 which surrounds the latch pin 9 of factory latch 7. This orientation is best illustrated in FIG. 4. When installed, pulling force created when a user pulls on loop 4 of webbing strap 3 will be transferred to latch pin 9. As will be recognized, this will cause movement of various components within factory latch 7, thereby allowing the disengagement. Again, retaining tab 8 will help to hold latch pull bracket 2 in place, and maintain coupling with latch pin 9.

Figure 6:
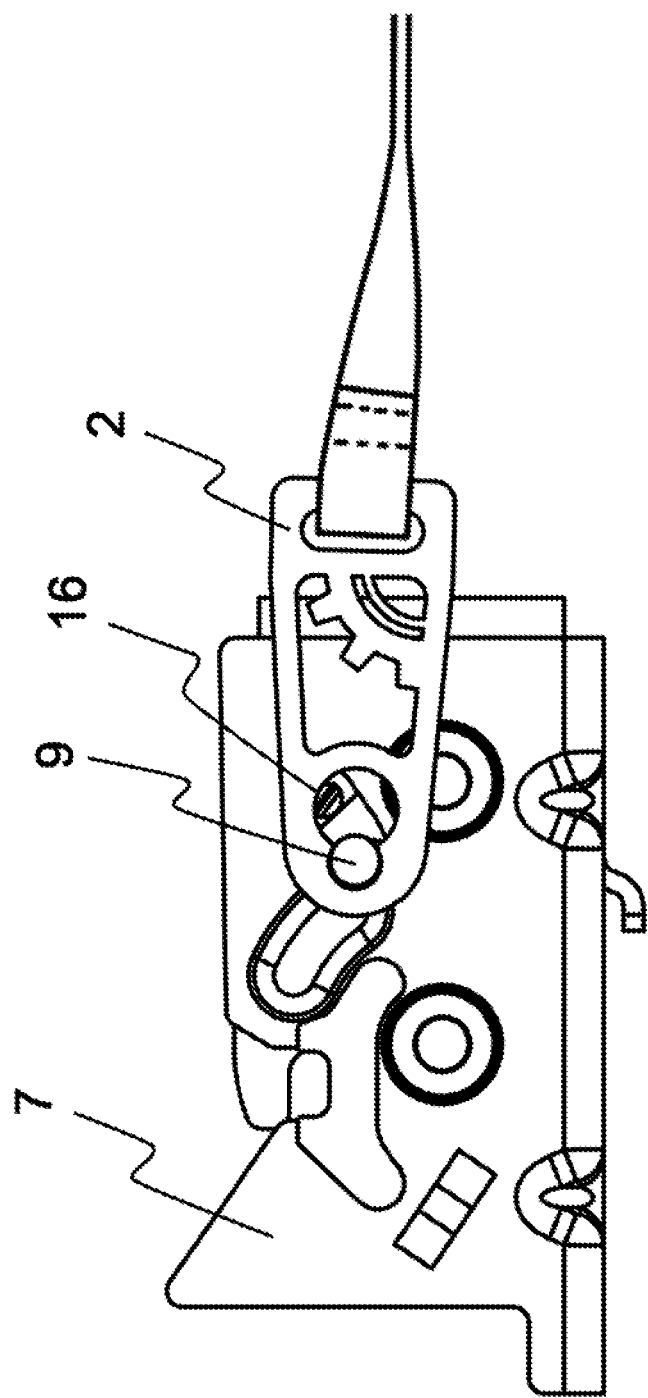
FIG. 6 is a close up side view illustrating the cooperation of the latch pull bracket and latch pin.

As generally mentioned above, latch pull bracket 2 includes a key hole feature 16 which is specifically designed to cooperate with latch pin 9 of the factory light 7. Turning now to FIG. 6, this relationship is better illustrated. As shown, latch pin 9 will easily be held within a narrow portion of key hole feature 16, thus allowing latch pull bracket to easily cooperate with that component. It will be understood and recognized that latch pin 9 is typically part of a spring loaded mechanism, thus the intent of latch pull bracket 2 is to exert force against this spring mechanism. In the context of the structure shown in FIG. 6, this will involve a pulling force urging latch pin 9 to the right. In this embodiment, it is further contemplated that the narrower portion of keyhole feature 16 will be sized slightly smaller than the diameter of latch pin 9. In this manner, an interference fit is created, which will thus keep latch pin 9 engaged within latch pull bracket 2, as shown. It is further contemplated that other approaches could be utilized, such as a keepers or holding devices to maintain the desired relationship between latch pin 9 and latch pull bracket 2.

Figure 7:
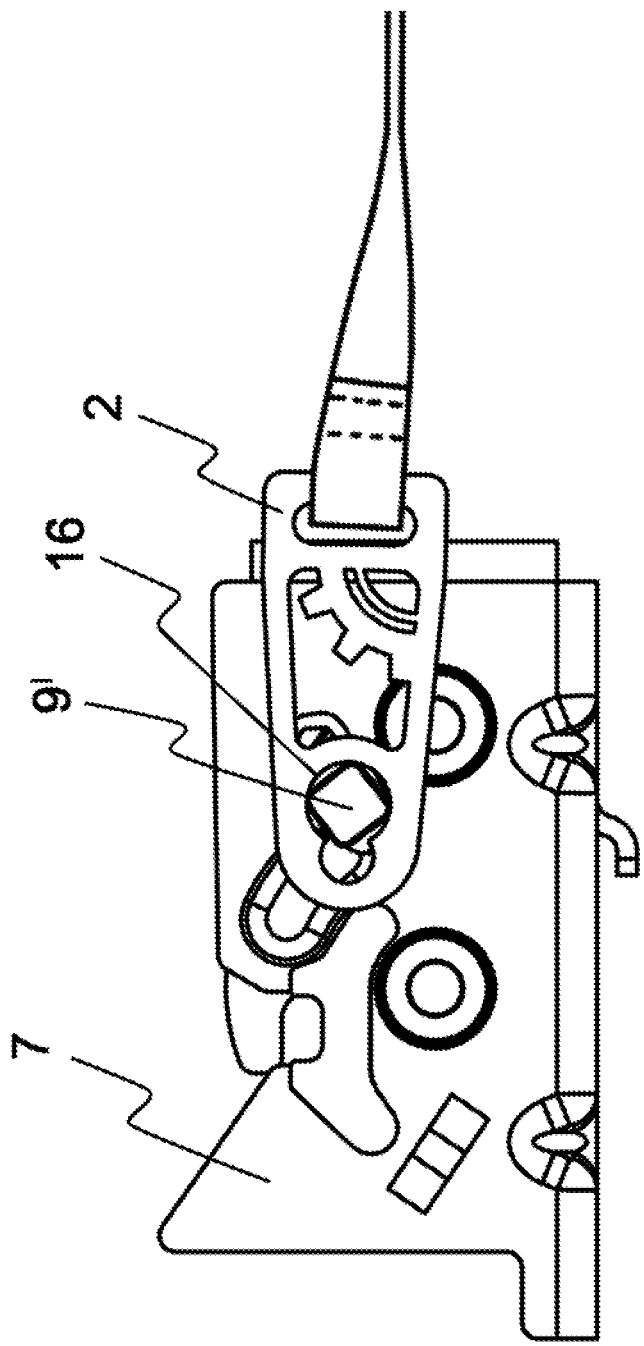
FIG. 7 is a close up side view illustrating the cooperation of the latch pull bracket and an alternative latch pin.

In certain circumstances, latch pin 9 will be configured differently. In the embodiment illustrated in FIG. 7, latch pin 9' is a square pin. In this case, the keyhole feature 16 of latch pull bracket 2 is specifically configured to also cooperate with latch pin 9'. More specifically, latch pin 9' will be received within the larger portion of keyhole feature 16 and interact with those structures. As illustrated, this allows a similarly configured keyhole feature to be used in both latch mechanisms.

Figure 9:
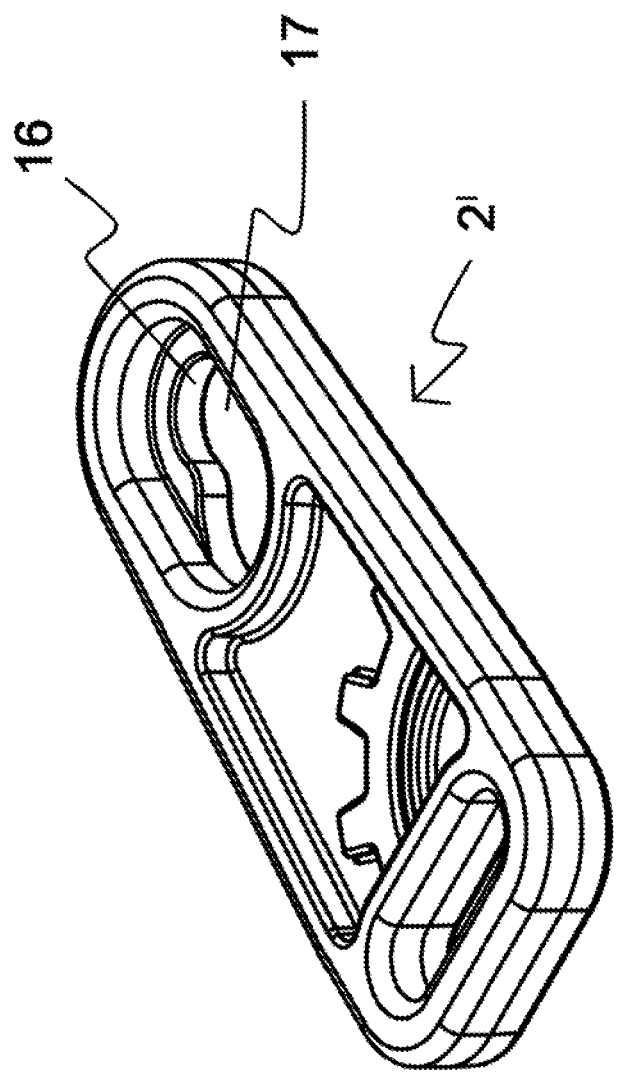
FIG. 9 is a perspective view of an alternative latch pull bracket.

As yet another alternative embodiment, latch pull bracket 2' could be configured so that the keyhole feature 16 includes a recessed portion of an overall opening 17. This configuration is better illustrated in FIG. 9. Naturally, this type of opening 17 would accommodate a latch pin 9" (not shown) which has a cap or top portion.

Figure 8:
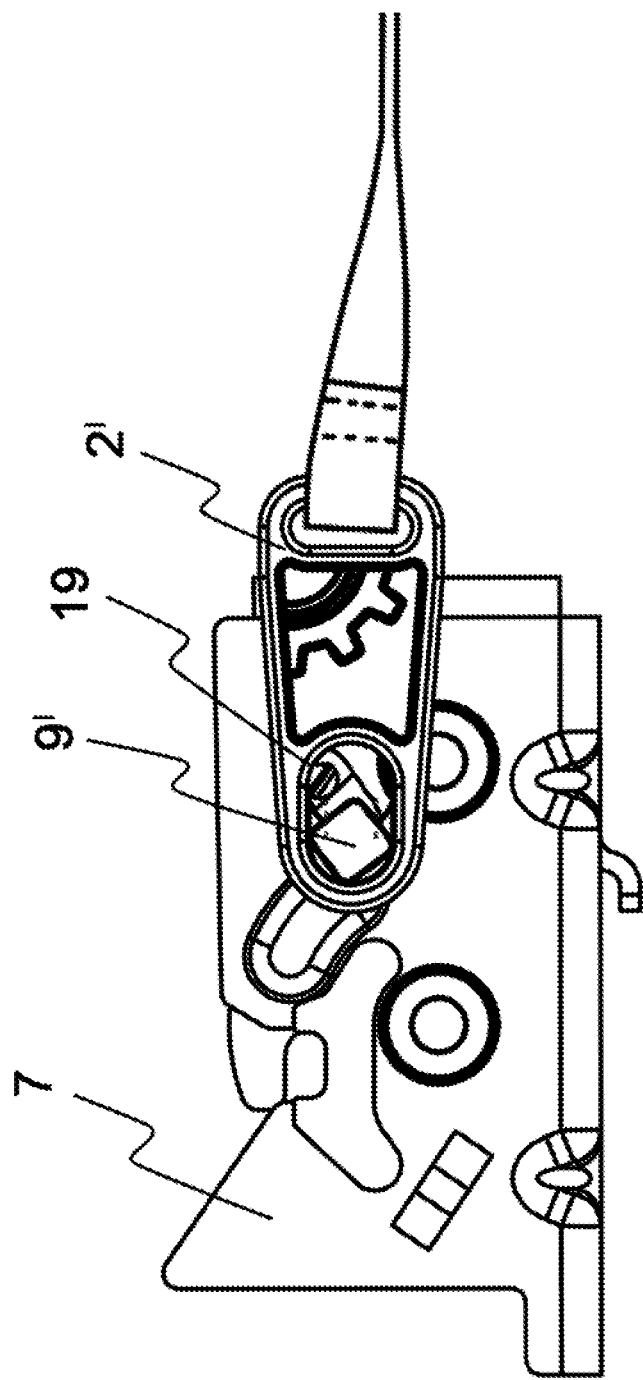
FIG. 8 is close up side view illustrating the cooperation of an alternative latch pull bracket and an alternative latch pin.

Lastly, yet another variation of latch pull bracket 2' is illustrated in FIG. 8, where the keyhole feature 16 is used in conjunction with h a square version of latch pin 9' in a manner generally discussed above. It is noteworthy that each of these mechanisms could be incorporated into rear seat latch device 10, depending on the needs or requirements dictated by latch pin 9. As generally discussed above, retaining tab 8 will also cooperate with latch pull bracket 2, or 2' so these components are held in a desired working orientation with one another.

As suggested by the variations outlined above, latch pull bracket can be modified or reconfigured to meet some of the unique needs presented by the application. For example, it may not be necessary to include the keyhole feature 16, but rather simply use a single hole. Other variations could be possible.

To install latch release device 10, the seat back if first released to gain access (often requiring a tool or wire to interact with the factory latch), and the bolts holding factory latch 7 are first removed. Next, latch pull bracket 2 is positioned to couple with and surround latch pin 9. As shown, keyhole feature 16 is specifically configured to allow this coupling. Next, latch base bracket 1 is positioned to surround factory latch 7, as generally illustrated in the Figures. Latch base bracket 1 and factory latch 7 can then be reattached to the seat using the previously removed bolts.

Due to the configuration of latch base bracket 1 and latch pull bracket 2, this process is easily accomplished by a single user with a minimal amount of time required.

Other embodiments of this design would utilize a different means of a) retaining the latch pull bracket on the pin and b) holding the strap in place. Instead of a retainer tab, a 'push nut' or locking shaft collar may be used to keep the latch pull bracket in place. Another embodiment may eliminate the strap support in favor of no support or using the headrest post as a means of keeping the strap accessible. Another embodiment would replace the Latch Pull Bracket and Webbing Strap with a single rigid handle.

Although the above mechanism has been described as a rear seat latch release device, modifications could be easily incorporated which allow the device to be applied to many different situations where latch mechanisms are incorporated. More significantly, the latch release device can be easily fitted to the existing latch mechanisms without significant removal or rework.

The mechanism may also be modified to incorporate an electrical solenoid, which would function to actuate the latch by the press of a button rather than a pull of a manual release mechanism like the webbing strap. This solenoid would mount to the latch base bracket and be wired such that the button may be hidden, providing easy but more secure access to the area. It is also contemplated that a locking solenoid could be used to keep the rear seat latch engaged so that unintended release does not occur.

Various embodiments of the invention have been described above for purposes of illustrating the details thereof and to enable one of ordinary skill in the art to make and use the invention. The details and features of the disclosed embodiment[s] are not intended to be limiting, as many variations and modifications will be readily apparent to those of skill in the art. Accordingly, the scope of the present disclosure is intended to be interpreted broadly and to include all variations and modifications coming within the scope and spirit of the appended claims and their legal equivalents

The invention claimed is:

1. A latch release device capable of cooperating with an existing factory latch mechanism, comprising:
   a latch base bracket having a latch base plate, a strap support and a retaining tab which extends upwardly from the latch base plate, the latch base bracket being configured for mounting immediately adjacent to the existing factory latch mechanism;
   a latch pull bracket having a keyhole feature therein configured to be operably coupled to a latch pin of the existing factory latch mechanism, the latch pull bracket being further held in the operable coupling relationship by the retaining tab; and
   a pull strap functionally coupled to the latch pull bracket, wherein pulling on the pull strap will cause force to be applied to the latch pull bracket thereby causing the latch pull bracket to exert force in a lateral direction upon the latch pin thereby causing lateral movement of the latch pin and the releasing of the existing factory latch mechanism.

2. The latch release device of claim 1 wherein the latch pull bracket has an oblong opening configured to receive and cooperate with the latch pin.

3. The latch release deice of claim 1 wherein the latch base plate has a plate portion and a receiving slot positioned between the plate portion and the retaining tab, the receiving slot configured to surround a portion of the existing factory latch mechanism when installed.

* * * * *